(12) United States Patent
Petzold

(10) Patent No.: US 6,622,557 B2
(45) Date of Patent: Sep. 23, 2003

(54) LEVEL SENSOR AND METHOD OF REGISTERING A LEVEL IN A CONTAINER

(75) Inventor: Sven Petzold, Wiesbaden (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/125,061

(22) Filed: Apr. 17, 2002

(65) Prior Publication Data

US 2002/0174719 A1 Nov. 28, 2002

(30) Foreign Application Priority Data

Apr. 21, 2001 (DE) .......................... 101 19 555

(51) Int. Cl.⁷ .............................. G01F 23/00
(52) U.S. Cl. .................... 73/304 C; 73/290 R
(58) Field of Search .................. 73/290 R, 304 R, 73/304 C

(56) References Cited

U.S. PATENT DOCUMENTS

| 4,204,427 A | * | 5/1980 | Gothe et al. | ............... 73/304 C |
| 4,674,329 A | * | 6/1987 | Mulder | .................... 73/304 C |
| 4,780,663 A | * | 10/1988 | Mulder | .................... 324/65 P |
| 5,144,835 A | | 9/1992 | McDonald | ................ 73/304 C |

FOREIGN PATENT DOCUMENTS

| DE | 3133239 | 3/1983 | | |
| FR | 2 751 074 A1 | * | 1/1998 | ........... G01F/23/26 |
| WO | 0026619 | 5/2000 | | |

* cited by examiner

Primary Examiner—Hezron Williams
Assistant Examiner—Rodney T. Frank
(74) Attorney, Agent, or Firm—Martin A. Farber

(57) ABSTRACT

In a level sensor (1) having a pair of measuring electrodes (4) and a pair of reference electrodes (5), reference electrodes (5a, 5b) have a horizontal section (12). The horizontal section (12) extends over the entire width of a container (2). In this way, physically limited inhomogeneities in the liquid in the container (2) are compensated for in the measurement of a reference variable.

13 Claims, 1 Drawing Sheet

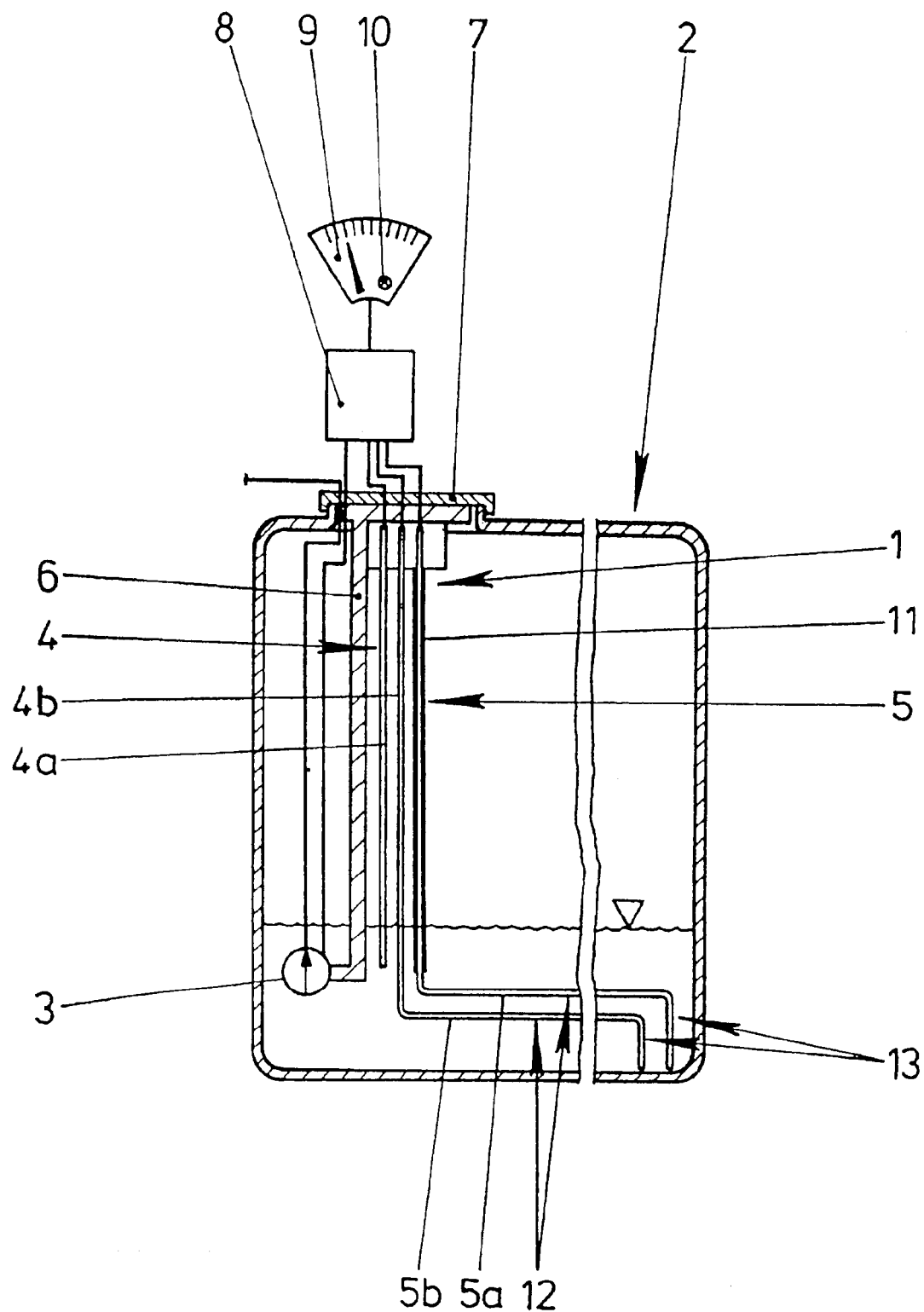

LEVEL SENSOR AND METHOD OF REGISTERING A LEVEL IN A CONTAINER

FIELD AND BACKGROUND OF THE INVENTION

The invention relates to a level sensor for a container, preferably for a washing water container in a motor vehicle, having electrodes for measuring electrical variables of a liquid in the container and having an evaluation unit for evaluating the measured electrical variables, a pair of reference electrodes provided to register a reference variable being provided for arrangement in the lower region of the container, and a pair of measuring electrodes provided to register measured variables dependent on the level extending over at least a subarea of the height of the container. Furthermore, the invention relates to a method of registering a level in a container, preferably in a washing water container of a motor vehicle, in which a pair of reference electrodes measures an electrical reference variable in the lower region of the container, a pair of measuring electrodes detects an electrical measured variable over the height of the container to be detected, and an evaluation unit calculates the level in the container from the measured electrical variables.

Level sensors of the type mentioned at the beginning are often arranged in current washing water containers and are known from practice. The level in the container results from the comparison of the measured variable determined on the measuring electrodes with the reference variable determined by the reference electrodes. Since the reference electrodes must continuously be located within the liquid in the container, these electrodes are arranged exclusively in the lower region of the container. Therefore, as compared with the pair or measuring electrodes, the pair of reference electrodes has particularly small dimensions. The disadvantage here, however, is that inhomogeneities of the liquid in the container have a very severe influence on the determined reference variable. For this reason, a comparison between the reference variable and the measured variable is less meaningful for the level determined. In particular in washing water containers for motor vehicles, there are often very extensive inhomogeneities, since the washing liquid is a mixture of antifreeze, detergent and water which changes frequently and is difficult to homogenize.

Thought has already been given to extending the pair of reference electrodes over the entire lower half of the container and to extending the pair of measuring electrodes over the upper half of the container. However, the disadvantage here is that, when the container is less than half full, no measured variable can be determined.

SUMMARY OF THE INVENTION

The invention is based on the problem of configuring a level sensor of the type mentioned at the beginning in such a way that it measures the level in the container as accurately as possible, even in the case of inhomogeneous liquids. Furthermore, the most accurate possible method of registering the level in a container is to be determined.

According to the invention, the first-named problem is solved in that, in relation to a section of the height of the container, the pair or reference electrodes has a greater surface than the pair of measuring electrodes.

As a result of this configuration, the reference variable is averaged over a particularly large region in an envisaged height of the container. Therefore, physically closely limited inhomogeneities of the liquids cannot distort the reference variable. The level in the container determined by means of the comparison between the measured variable and the reference variable is therefore particularly accurate. The electrical variables determined can be, for example, the electrical resistance, a capacitance or comparable variables between the electrodes. A further advantage of the invention is that the reference electrodes can be arranged close to the bottom region of the container. This permits the registration of measured variables by the pair of measuring electrodes over a particularly high height range of the container.

According to an advantageous development of the invention, the reference electrodes can have a particularly large surface in a limited section of the height if the pair of reference electrodes has a horizontal section.

In the event of slopping of the liquid in the container, according to another advantageous development of the invention, even inhomogeneities present in layer form are averaged in the reference variable if the pair of reference electrodes extends over the entire width of the container.

The level sensor according to the invention requires a particularly low expenditure on construction if at least one of the reference electrodes is configured as an electrical conductor insulated exclusively in the upper region of the container.

A minimum distance between the horizontal section of the reference electrodes and the bottom of the container may be ensured in a simple way, according to another advantageous development of the invention, if the pair of reference electrodes has at its free end an angled portion pointing in the direction of the container bottom.

It is often the case that the quantity of liquid in the container is displayed in the case of a full to virtually empty container. In the case of a virtually empty container, on the other hand, a warning signal is generated which, for example, is intended to warn the driver of the motor vehicle about a threatened failure of the washing system. In this case, there is always still a reserve quantity of approximately one to one and one half liters present in the washing water container. According to another advantageous development of the invention, the reserve quantity in the container can be determined particularly accurately if the pair of reference electrodes is arranged completely within a reserve region of the container.

The pair of measuring electrodes could, for example, be led as far as the bottom region of the container. However, according to another advantageous development of the invention, the reserve region may be determined particularly accurately if at least one of the electrodes of the pair of measuring electrodes is led as far as immediately before the reserve region. In this way, in the case of a measurement of the electrical resistance by means of the pair of measuring electrodes, the start of the reserve region is defined by an abrupt rise in the electrical resistance.

According to another advantageous development of the invention, it contributes to the further enlargement of the surface of the reference electrode if the pair of reference electrodes is of lamellar configuration.

The second-named problem, namely the provision of the most accurate method possible of registering the level in a container, is achieved, according to the invention, in that the registration of the electrical reference variable is carried out over a larger horizontal region of the container than the registration of the electrical measured variable.

In the case of a virtually empty container, it may be necessary to determine the residual quantity that is still present, in order for example to switch off the pump in order to protect it against damage, before the container has been emptied completely. According to another advantageous development of the invention, the determination of the residual quantity in the container requires a particularly low outlay on construction if, in the reserve region of the container, the level is calculated via the duration of the pump operation and the volume flow delivered. The volume flow may be determined, for example, by trials.

According to another advantageous development of the invention, a complicated determination of the duration of the pump operation may be avoided if, in the reserve region of the container, the level is determined via the change in the electrical reference variable. In this case, a proportional change in the level may approximately be assumed as a function of the change in the measured reference variable.

BRIEF DESCRIPTION OF THE DRAWING

The invention permits numerous embodiments. In order to illustrate its basic principle further, one of these is illustrated in the drawing and will be described below. Said drawing shows, in schematic form in a single FIGURE, a level sensor 1 according to the invention in a container 2 designed as a washing water container for a motor vehicle.

DETAILED DESCRIPTION OF THE PREFERRED EMBODIMENT

In the container 2, a pump 3 and two pairs of electrodes 4, 5 are fixed to a holding part 6. The holding part 6 is fabricated in one piece with a lid 7 of the container 2. The pump 3 delivers liquid from the container 2 to washer jets (not illustrated) belonging to the motor vehicle. The pairs of electrodes 4, 5 and the pump 3 are connected to an evaluation unit 8 arranged outside the container 2. Th evaluation unit 8 uses the signals from the pairs of electrodes 4, 5 to determine the level of the liquid in the container 2 and indicates this as a volume value on an indicating device 9. The indicating device 9 additionally has a warning lamp 10 to display a residual quantity warning.

One of the pairs of electrodes is designed as a pair of reference electrodes 5 and has a reference electrode 5a which is led as far as a lower region of the container 2 envisaged as a reserve region. The other pair of electrodes is a pair of measuring electrodes 4 having a measuring electrode 4a arranged between insulation 11 led from the lid 7 as far as the reserve region and the bottom region of the container 2. The pairs of electrodes 4, 5 have a common electrode arranged in the center, the section belonging above the reserve region being designed as a measuring electrode 4b and the section arranged within the reserve region being designed as a reference electrode 5b.

In order to average the measured electrical variables in the event of inhomogeneities in the liquid, the reference electrodes 5a, 5b each have a horizontal section 12, whose free end is adjoined by an angled portion 13 pointing in the direction of the bottom of the container 2. The horizontal sections 12 are illustrated one above the other in the drawing. Of course, the sections 12 can also be arranged beside each other in the same section of the height. In order to enlarge its surface, the reference electrodes 5a, 5b can be of lamellar configuration with lamellae projecting into the plane of the drawing.

The pair of measuring electrodes 4 determines an electrical measured variable of the liquid above the reserve region. With the pair of reference electrodes 5, a reference variable that depends on the composition and the temperature of the liquid may be determined. The evaluation unit 8 places the reference variable and the measured variable in a relationship to one another and uses this to determine the level above the reserve region. If, as the level in the container 2 falls, the determined measured variable changes abruptly, this is an indication of the fact that one measuring electrode 4a no longer dips into the liquid, and therefore the reserve region has been reached. In the reserve region, the residual quantity remaining in the container 2 can be calculated approximately via the duration of the pump operation and the volume flow determined in advance, for example by means of trials, or a proportional change in the reference variable determined by the pair of reference electrodes 5 with the level may be assumed.

I claim:

1. A level sensor for a container, preferably for a washing water container in a motor vehicle, comprising electrodes for measuring electrical variables of a liquid in the container and comprising an evaluation unit for evaluating the measured electrical variables, a pair of reference electrodes provided to register a reference variable being provided for arrangement in a lower region of the container, and a pair of measuring electrodes provided to register measured variables dependent on the level extending over at least a subarea of height of the container, wherein, in relation to a section of the height of the container (2), the pair of reference electrodes (5) has a greater surface than the pair of measuring electrodes (4).

2. The level sensor as claimed in claim 1, wherein pair of reference electrodes (5) has a horizontal section (12).

3. The level sensor as claimed in claim 2, wherein the pair of reference electrodes (5) extends over the entire width of the container (2).

4. The level sensor as claimed in claim 1, wherein the pair of reference electrodes (5) extends over the entire width of the container (2).

5. The level sensor as claimed in claim 1, wherein at least one electrode (5a) of the pair of reference electrodes (5) is configured as an electric conductor insulated exclusively in an upper region of the container (2).

6. The level sensor as claimed in claim 1, wherein the electrodes (5a, 5b) of the pair of reference electrodes (5) have at their free end an angled portion (13) pointing in direction of bottom of the container.

7. The level sensor as claimed in claim 1, wherein the electrodes (5a, 5b) of the pair of reference electrodes (5) are arranged completely within a reserve region of the container (2).

8. The level sensor as claimed in claim 1, wherein at least one electrode (4a) of the pair of measuring electrodes (4) is led as far as immediately before the reserve region.

9. The level sensor as claimed in claim 1, wherein the electrodes (5a, 5b) of the pair of reference electrodes (5) are of lamellar configuration.

10. A method of registering a level in a container, preferably in a washing water container of a motor vehicle, comprising the steps wherein a pair of reference electrodes measures an electrical reference variable in a lower region of the container, a pair of measuring electrodes detects an electrical measured variable over height of the container to be detected, and an evaluation unit calculates level in the container from the measured electrical variables, and wherein registration of the electrical reference variable is carried out over a larger horizontal region of the container than registration of the electrical measured variable.

11. The method as claimed in claim 10, wherein in a reserve region of the container, the level is calculated via duration of a pump operation and volume flow delivered.

12. The method as claimed in claim 11, wherein in the reserve region of the container, the level is determined via change in the electrical reference variable.

13. The method as claimed in claim 10, wherein in a reserve region of the container, the level is determined via change in the electrical reference variable.

* * * * *